Dec. 17, 1968 M. J. HOLTON ET AL 3,417,366

ELECTRICAL TERMINAL DEVICE AND METHOD OF FORMING THE SAME

Filed Aug. 4, 1966 2 Sheets-Sheet 1

INVENTORS.
Morris J. Holton
Sol Hasson
BY Silverman + Cass
ATTORNEYS

ELECTRICAL TERMINAL DEVICE AND METHOD OF FORMING THE SAME

INVENTORS.
Morris J. Holton
Sol Hasson
BY Silverman & Cass
ATTORNEYS

United States Patent Office 3,417,366

Patented Dec. 17, 1968

3,417,366

ELECTRICAL TERMINAL DEVICE AND METHOD OF FORMING THE SAME

Morris J. Holton, Morton Grove, and Sol Hasson, Skokie, Ill., assignors to Advance Transformer Co., Chicago, Ill., a corporation of Illinois Filed Aug. 4, 1966, Ser. No. 570,305
4 Claims. (Cl. 339—96)

ABSTRACT OF THE DISCLOSURE

An electrical terminal junction between a fine wire internal lead and a relatively heavy stranded wire external lead and a method of making said junction, which method comprises the steps of laying the fine wire within the notch of a V-shaped terminal member, soldering said fine wire in place therein, coating the soldered connection and terminal member with an electrical insulating compound, as by vacuum impregnation with an asphaltic based compound, placing the external lead in the notch of the thus treated V-shaped terminal member and then crimping the arms of said terminal member in a reverse inward curl with the external lead therein and by means of a shaping die or punch to form the novel electrical junction, said junction having the solder functioning as a malleable matrix or cushion for the fine wire embedding same to prevent fracture thereof and the insulating compound protecting both the fine and the stranded wire against entry of moisture. A particular electrical terminal member is disclosed as formed as a unitary sheet metal structure having a V-shaped portion and a body portion normal disposed relative to the notch of the V and extending from one end of said V portion, means integral with the other ends of the V portion for securing a wire thereto, the inner surface of said V portion having a plurality of irregularities, such as scores, therein, the V portion capable of receiving a fine wire within the notch thereof and covered with electrical insulating material and a stranded wire lead thereover, the arm of said V portion arranged to be crimped in an inward curl to form a cushioned, moisture-protected terminal junction.

This invention relates generally to electrical terminals for electromagnetic and the like apparatus and more particularly is concerned with an electrical terminal device especially for use in the manufacturing of fluorescent ballasts and a method of forming the same.

While not limited to the field of fluorescent ballasts, the invention will be described in connection therewith, since the invention was made particularly for the purpose of providing better terminal joints for fluorescent ballasts. The invention is believed to have much wider application.

In the manufacture of fluorescent ballasts, that is to say, ballasts for use with fluorescent lamps, the ballasts are finally sealed with potting compound, enclosed in metal canisters and when sold for installation into fixtures and the like, have robust flexible insulated wire leads extending from the canister to enable the ballast properly to be hooked up in the lamp circuit. The wire leads are customarily used by workmen to handle the ballast and for other reasons additionally are subject to considerable strain, such that it is normal to provide terminal joints within the ballasts which function as strain relievers in addition to their function as terminals for multiple wires. The coils of most ballasts include at least one made out of windings of very fine wire, and it would be impractical to extend these wires out of the canister and attempt to use them for hooking the ballast into the fluorescent lamp circuit.

Since the ballast is substantially irretrievably sealed when finally completed, failure of any internal connection usually results in a complete loss of the entire ballast, which can be quite expensive. If the failure occurs after the ballast has been placed in service, and is not detected by the ballast manufacturer, the resulting loss and inconvenience is multiplied since it will occur while the ballast is in installed condition.

The general method of manufacturing ballasts is well-known and the details need not be described, but a short explanation will be helpful. The ballast will usually have some form of transformer unit and one or more condensers all enclosed in the canister. The terminal junctions are normally mounted on the transformer unit, because terminal boards are readily secured mechanically to this unit. A typical unit will have a laminated iron core held in assembly by end clamps, and mounting two or more generally sleevelike coils coaxially on a central winding leg of the core. The wire ends and perhaps taps are pulled out of the ends of the coils and extended to sheet metal terminal members which are riveted on the terminal boards that are secured to the core. In some cases the terminal boards are simply held on to the core by means of adhesive tape, and in some instances the boards are attached to the end clamps which hold the core laminations in assembly. The invention is applicable to both types of construction.

After the coil wire ends are attached mechanically to the terminal members they may be soldered or not depending upon the technique being followed. The usual method is to attach the external leads before soldering, these being relatively robust wire of multi-strand construction. As an example, the fine wire may be as fine as No. 30 U.S. wire gauge, and the heavy wire may be as heavy as No. 16 or 18. Recently, instead of soldering, crimping methods have been used in which the wires are laid in the notch or groove formed between the arms of a sheet metal terminal member of V configuration, and the ends of the V crimped in reverse bends curled inwardly, biting into the resulting wires and compressing them. A proper and successful crimp of this kind will so compress the wires on the interior of the resulting tubular joint that practically a solid metal mass is formed on the interior of the terminal member. There are however, difficulties with such joints and the invention herein is directed to the solution of the problems which have been encountered with a view to provide crimped joints which are wholly reliable and durable.

After the unit has been completely wired, it may be wholly vacuum impregnated with varnish or, as recently practiced, the manufacturing processes may include vacuum impregnation with any of the asphaltic wax compounds that are commercially available. This will establish moisture barriers for the components of the unit. Not all ballasts have such impregnation, but instead depend wholly on the potting step described next.

The wired unit is pressed into a layer of potting compound laid down in the bottom of the canister, the leads are extended through holes or slots in the canister ends, the canister is filled with potting compound and the cover is installed. This completes the ballast.

Variations in the manufacturing processes are well-known. The same manufacturer may solder wires and use the crimping technique in the same plant for different ballasts. The invention herein utilizes a combination of both methods, the heavy lead wires being the ones attached by crimping.

One problem with the crimping method is that it subjects the fine wire strand to very high pressure, even to the point of flattening it. This strain hardens the fine wire strand at the point where its tensile strength is needed most. Vibration of the embrittled wire after use of the ballast for a while can result in fracture with the result of an open circuit. Most ballast cores vibrate, such vibration being readily transmitted to the terminal boards and their terminals, especially where the boards are mounted on the core clamps.

Variation in crimping pressure and in application of the crimping tool or die may sometimes strain the fine strand and break it, or may not secure it, so that a loose connection is provided. Likewise, where the connection resistance of a wire is important, a crimped joint may be disadvantageous if the wire is loose or if oxide forms. This latter problem, namely the formation of oxides, produces difficulties in low voltage filament circuits. These oxides form on the surface and raise the resistance to the flow of current through the filament, thereby decreasing the starting ability of the lamp and the ability of the lamp to maintain a high level of illumination. Over a period of time, corrosion may also result in eventual fracture of the wire.

The primary objects of the invention are to provide a novel method for making terminal junctions and the structure resulting from such method. Specifically the invention contemplates a terminal junction for an electromagnetic device in which a fine wire and a relatively heavy wire are efficiently and permanently connected, the fine wire being soldered and sealed into the joint although the heavy wire is secured by crimping.

Other objects of the invention are concerned with the provision of variations in the method and structures of the invention, and in the specific novel features thereof.

The advantages of the invention which are not specifically named will occur to those skilled in this art as a description of the method and structure for preferred embodiments is set forth in detail hereinafter in connection with illustrations of the same.

Figure 5:
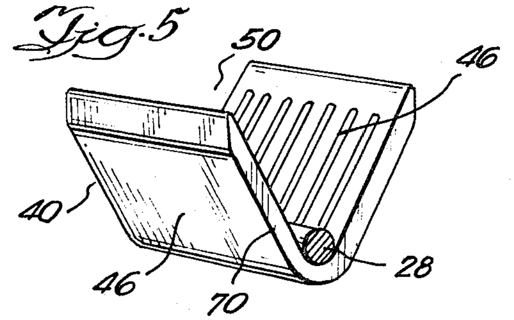
FIG. 5 is a fragmentary perspective view illustrating a step in the method of the invention, such step comprising laying a fine wire into the notch formed by the arms of the V of the terminal member.
Figure 5A:
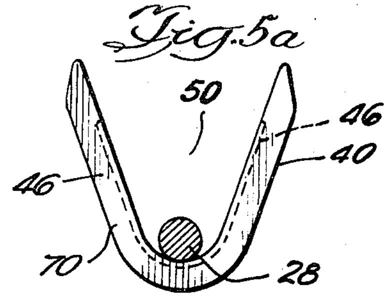

FIG. 5*a* is an end view of the structure illustrated in FIG. 5.

Figure 6:
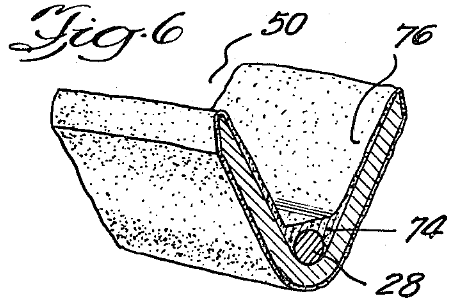

FIG. 6 is a perspective view similar to that of FIG. 5, but in this instance the terminal member has been dipped in solder which coats the member and covers the fine wire with a layer of solder. In this view the end which is visible is shown in section although there would be solder covering the same if dip soldering was used.

Figure 6A:
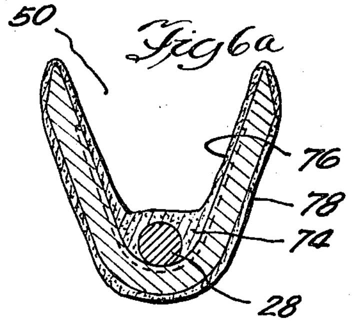

FIG. 6*a* is an end view of the structure of FIG. 6, but again the end is shown in section.

Figure 7:
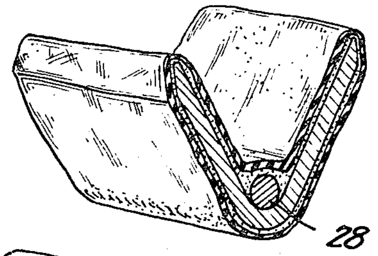
Figure 7A:
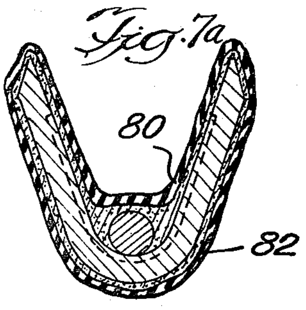

FIGS. 7 and 7*a* are views similar to those of FIGS. 6 and 6*a* respectively, except in this case the terminal has been coated with an asphaltic wax compound.

Figure 8:
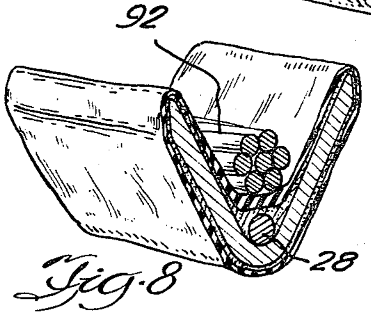
Figure 8A:
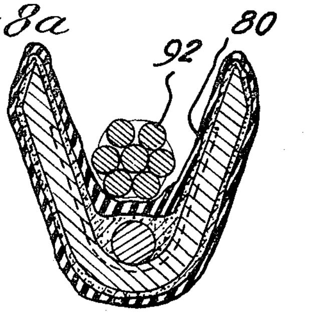

FIGS. 8 and 8*a* are views similar to those of FIGS. 7 and 7*a* respectively, except in this case a heavy wire end has been laid in the notch on top of the asphaltic wax, this heavy wire being a part of an external lead.

Figures 9, 10:
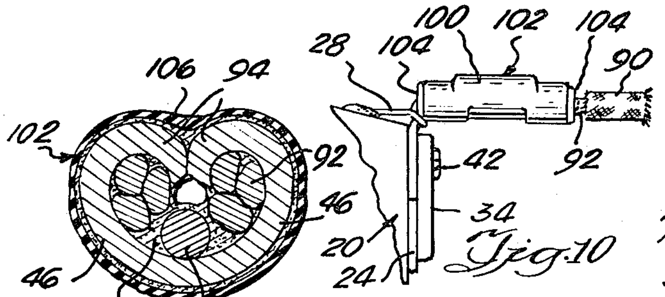

FIG. 9 is a sectional view through the terminal joint after crimping, which has curled the ends of the V into the center of the terminal member to form a tubular configuration.

FIG. 10 is a fragmentary side elevational view of an electromagnetic unit showing a complete terminal joint.

Generally the invention comprises a method utilizing familiar crimping techniques but which includes a step heretofore considered abhorrent to the formation of a good electrical joint; further, the invention is directed to the resulting joint. In forming the terminal joint, a fine wire is laid into the notch of a V-shaped sheet metal terminal member, and in this condition is soldered in place. Thereafter the terminal member is coated, preferably by vacuum impregnation, with an asphaltic wax compound to provide high resistance to moisture. Thereafter the external lead is placed in the notch of the V, and the V is crimped by means of a shaping die or punch. In this process, the asphaltic wax and even a small amount of solder may be extruded from the terminal, but the resulting joint has the solder forming a malleable matrix or cushion embedding the fine wire and protecting same, and the asphaltic wax coats the entire terminal joint preventing entrance of moisture to the fine wire and the other strands of the lead wire within the terminal member.

Figures 1, 2, 3, 4:
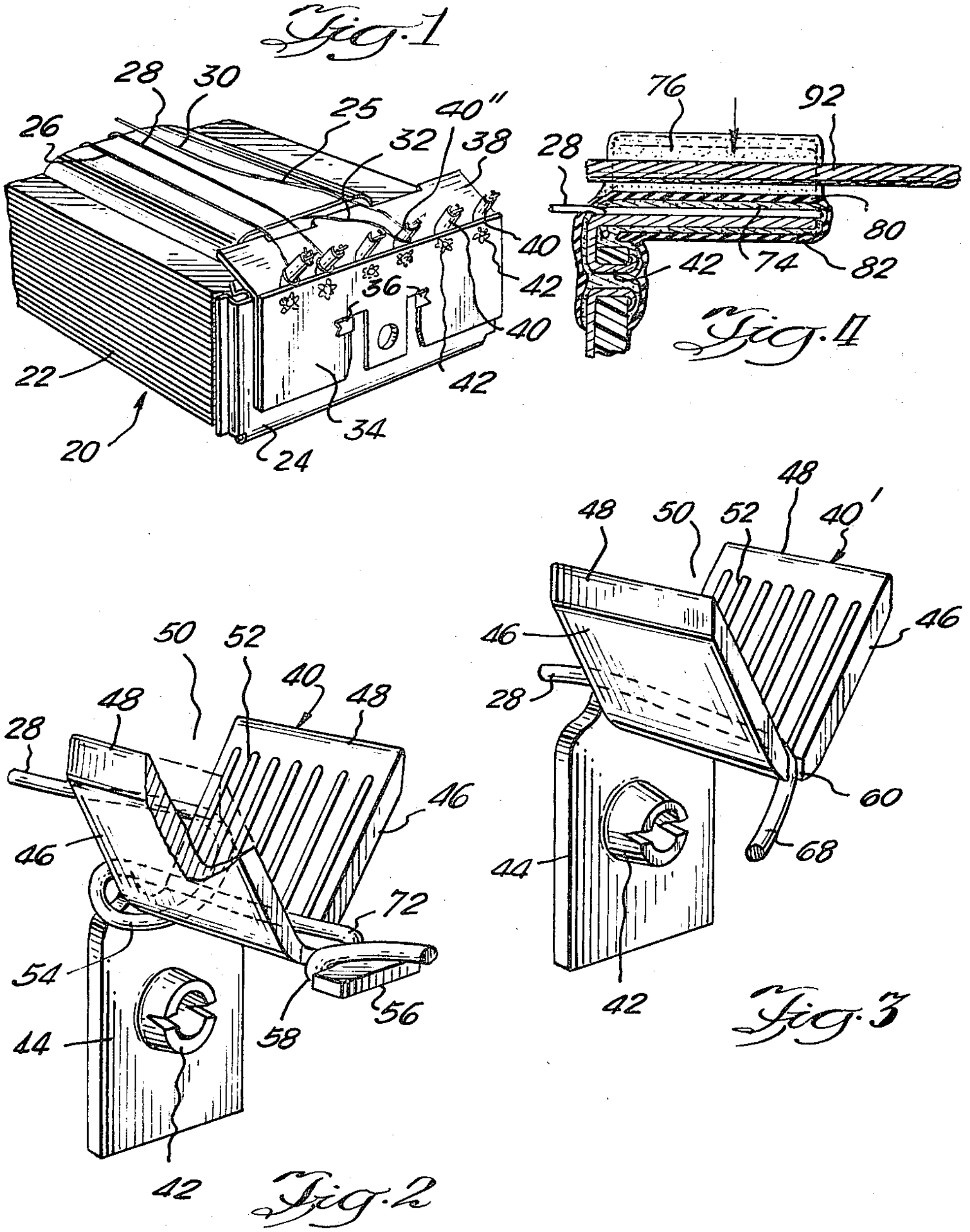
FIG. 1 is a fragmentary perspective view of the end of a transformer or choke unit which is eventually to be potted within a canister in forming the ballast of the invention.
FIG. 2 is an enlarged perspective view showing a form of sheet metal terminal member in the process of having a wire connected thereto, a portion being broken away to show details.
FIG. 3 is a perspective view similar to that of FIG. 2 but showing a modified form of the invention.
FIG. 4 is a diagrammatic sectional view taken through the terminal member during the formation of the joint.

Referring now to the drawings, FIG. 1 is a perspective view showing a portion of what has been previously referred to as an electromagnetic unit 20 that forms a part of a ballast. This unit comprises a core 22 which is formed of steel laminations held together by suitable steel end clamps one of which is shown at 24. One or more coils of wire are mounted on the core engaging over a central winding leg of the core which is not shown. The coil is shown at 25, and the same is formed of fine wire windings with insulating layers of paper between layers of turns. When the coil is completed, the fine wire ends are pulled out of the ends of the coil and the insulation is scraped off since these wires are normally enamel-coated.

In FIG. 1, the illustration includes four such wires as, for example, shown at 26, 28, 30 and 32. The wires 26, 28 and 32 may be connected to the coil 24, while the wire 30 may extend from a previous coil. The number of fine coil end wires is determined by the type of circuit and the type of ballast, and these vary considerably. For example, some ballasts are intended to ignite and operate lamps which require no filament windings and which have only single terminals for their filaments. Others have filaments which continuously carry current and require separate filament windings on the transformer and hence have many more coil ends. The illustration is intended only to enable one to understand the invention without the need for complicated wiring diagrams.

Continuing now with the explanation of the electromagnetic unit 20, it will be seen that there is a terminal board of insulating paper or the like at 34 connected to the face of the clamp 24 by suitable ears 36, having an insulating inwardly bent flap 38 and having a plurality of terminal members 40 mounted thereto, as for example, by suitable rivets or grommets shown at 42 extending through the terminal board 34. It is common to manufacture the type of sheet metal terminal members with which this invention is concerned with protruding formations such as shown at 42 in FIGS. 2 and 3 which may be inserted in perforations provided in the board 34 and swaged over to form rivets or grommets.

FIGS. 2 and 3 illustrate two forms of the type of sheet metal terminal member which may be used in connection with the invention. The terminal member of FIG. 2 is designated 40 and that of FIG. 3 is designated 40'. Each has a body portion 44 and a pair of arms 46 which may have sharp edges at 48 along its upper end. A V-notch is thereby provided at 50 into which the wires will be laid as described hereinafter.

The terminal members 40 and 40' are provided with interior scores or cuts or ribs, either protruding or formed below the surface, these scores being shown at 52 in FIGS. 2 and 3. Such scores will be produced at the time the terminal members 40 and 40' are being blanked by simple punch press techniques. When the fine wire is soldered, as shortly will be explained, the scores will assist in forming a good joint, and when the joint is being crimped, the scores will assist in establishing a good electrical connection with the heavy wire.

As seen in FIG. 2, a fine wire such as, for example, the wire 28 is first laid in the notch 50 of the open terminal member 40 or 40'. Preferably a loop may be taken around the junction between the arms 46 and the body portion 44 as shown at 54 in FIG. 2, this loop ending in the bottom or root of the V where the wire end is laid. The free end is then wrapped around a T-shaped extension 56 integral with the terminal member 40 as shown in FIG. 2. The single turn around the leg of the T formation 56 is designated 58.

In the case of the structure shown in FIG. 3, the wire 28 is laid directly in the notch 50, and a slot 60 which is cut at the front end of the terminal member 40' accommodates the free end 68 of the wire 28 which wedges into the slot to hold the wire 28 in place for soldering.

This step of laying the end of the wire 28 into the groove 50 of the respective terminal members 40 is accomplished for all of the free wire ends. Obviously these wire ends must be clean, and hence the insulation which normally coats these wires is scraped off before they are laid into their respective terminal members. Some solders will dissolve the enamel, obviating scraping. As shown in FIG. 1, wires 26 and 28 are the only ends which are secured to their respective terminal members 40, but the wires 24 and 32 both are laid into the same terminal member 40 which is designated 40'' in FIG. 1. Very often two or more wire ends will require securement to a single terminal member as just described.

The step which has just been described is shown in its basic form in FIGS. 5 and 5*a* where the simple wire end 28 is laid in the notch 50 between the arms 46 of the V-shaped configuration of the terminal member 40.

The next step in carrying out the invention is to solder the wire 28 in place. This is illustrated in FIGS 6 and 6*a*. The soldering may be done by using soldering guns or soldering irons or by dip soldering, which is most efficacious. Thus all of the ends are laid in their proper terminal members, and the entire end of the unit 20 is bodily dipped into the solder pot so that the terminal members 40 are immersed. As a result of this, the wire ends 28 are now soldered into the bottom of the respective notches of their terminal members as shown in FIGS. 6 and 6*a*, and a thin coating of solder is applied over the entire terminal member. The ends of the terminal member, as shown in FIGS. 5 and 5*a*, do not include any structure such at the T-shaped formation 56 or the notch 60 since these wire securing means, while advantageous, are not essential to the invention. Accordingly the end faces of the terminal member 40, in FIGS. 5 and 5*a* are shown in elevation, such end faces being designated 70 for convenience. In FIGS. 6 and 6*a*, however, the end faces are shown in section since it will be obvious that if there is dip soldering, such ends, as well as the end of the wire 28, will be coated with solder and not visible. It may be assumed therefore that this is a sectional view taken just immediately behind the surface which has been covered with solder, in order to aid in the explanation of the invention.

In the case that the structure of FIG. 2 is used, after the wire ends have been soldered, a single cutting tool is used to cut all of the ends at one time. The tool also may cut off all of the T-formations 56, if so desired. For example in FIG. 2, this cut will be taken through the terminal 40 at the location shown in broken lines at 72. In the event that no formation such as 56 is used the protruding ends will all be cut off.

As a result of the soldering step, it will be seen that the wires 28 are now embedded in a matrix 74 of soft solder and that the inside of the notch 50 has a coating, albeit quite thin, of solder shown at 76. The thickness and sizes of the various layers in the figures is exaggerated in order to enable the invention to be fully understood but it should be appreciated that these coatings, as well as others mentioned, will be extremely thin. The exterior of the terminal member 40 will also have a coating of solder as indicated at 78, but this is not essential to the invention.

The next step in forming the joint is to coat the terminal members as thus far constituted with a coating of asphaltic wax or some other substantially thermoplastic insulating compound which has high moisture resistance in order to provide a moisture barrier for the wires 28. Such coating may be applied either by dipping or by vacuum impregnation. Vacuum impregnation is advantageous since, in addition to coating the terminal members 40, the entire ballast is coated with such wax so that its moisture resistance properties are made available to other components of the electromagnetic unit 20. The coating may also be described as substantially amorphous, to signify an absence of brittleness at normal temperatures so that it is extrudable.

In FIGS. 7 and 7*a*, such coating is shown surrounding the entire terminal member 40 on top of the layers of solder 76 and 78. The layer of asphaltic compound on the interior is designated 80 and on the exterior is designated 82.

The material which is preferred for this step is an asphaltic wax compound which is commercially available for ballast impregnation. Many different grades and varieties of this material are available from several manufacturers. The characteristics required of the material are somewhat as follows:

First, the material must be insulating and moisture-resistant;

Second, the materiral should flow freely at an easily reached temperature, well above the maximum operating temperature of the ballast, this being about 220° F.;

Third, the material should have very little cold flow at temperatures up to and somewhat beyond the maximum operating temperature of the ballast;

Fourth, the material should be extrudable even at room temperatures, without crumbling or breaking up.

To describe the general characteristics of such compound, it is referred to herein as substantially amphorous and as thermoplastic. The word "amphorous" is not used in the sense that the material is non-crystalline, which of course, is true. but in the sense that it is capable of being shaped by application of stress, without substantial breakage. Some thermosetting varnishes which are yieldable under impact can be utilized, as well.

Impregnants of the asphaltic wax compound type are made of mixtures of polymerized and/or oxidized asphalt and synthetic wax. The asphalt is preferably resinous, and the polymerization is carried out chemically. Oxidization is accomplished by blowing air or oxygen through the asphalt. The synthetic waxes are essentially high molecular weight stearamides with melting points much higher than those of micro-crystalline wax.

A typical and satisfactory compound is one identified by Catalog No. 6333, made by Zenith Products Co. of Schiller Park, Illinois. This compound contains about 10 to 20% by weight of synthetic wax and the remainder oxidized and/or polymerized asphalt. The flow point of this compound is quite sharp, being between 325° F. and 350° F. so that it is easily rendered fluid for vacuum impregnation techniques. There is a softening above about 275° F., but below that temperature, cold flow is a minimum.

Other suitable compounds are asphaltic materials mixed with rood resin and synthetic resins. Adjustment of flow temperature is achieved by varying the proportions of the components. Even so-called soft varnishes which can yield under impact may be used.

The next step which is accomplished is to bare the protruding end of the lead wire 90 to form a stranded end 92. As a general rule, such strands have always been tinned so that the interstices between strands are filled with solder, but this is not essential to the invention in view of the manner in which the resulting terminal joint is made.

The end 92 is shown laid into the notch 50 in FIGS. 8, 8*a* and in FIG. 4, this being done with the wire 92 lying on top of the coating 80.

At this point it might be interesting to note that the asphaltic wax compound, or whatever other thermoplastic insulating material is used, is an insulator of electricity. Although it may appear that the layer 80 will serve to insulate the heavy wire end 92 from the terminal member 40, it actually does not prevent the last step of crimping from establishing an excellent electrical contact. What it does, however, is to prevent moisture from entering the resulting joint by filling the interstices which may exist within the joint after the crimping.

In FIG. 9, the crimping operation has taken place. The side walls or arms 46 have now been curled in a reverse bend as shown at 94, biting down into the wire end 92. The strands of the wire end 92 are forcibly compressed to assume the configuration which results from the application of pressure by the crimping die or punch. The interior of the resulting tubular member 100 is in the form of a solid, tightly packed mass of metal as generally shown in FIG. 9 in which the fine wire strand 28 is embedded in its protective matrix 74 of solder, and the strands forming the wire 92 are tightly pressed against the matrix 74 and the interior walls of the tubular member 100, thereby forming the terminal joint 102.

In the process of crimping, any asphaltic compound forming the layer 80 on the interior of the terminal joint 102 will be extruded out of the joint as indicated in FIG. 10 by the end masses 104, thereby protecting the ends of the joint 102 from moisture. If there are any interstices formed inside the joint 102, they will be filled with the asphaltic compound, thereby protecting and sealing the fine wire 28 from moisture. The cleft at the junction of the curled walls will have a quantity of the asphaltic compound located thereat as shown in FIG. 9 at 106.

From the above it will be seen that, besides being protective against moisture, due to the presence of the thermoplastic insulating compound, the wire 28 being embedded in its matrix 74 of solder is protected from strain or breakage which might occur during the crimping step. It may be noted that during the crimping step, often soft solder may be extruded from the ends of the joint 102 and may be pushed into the interstices between the several strands forming the wire 92, thereby establishing better electrical contact.

Tests conducted over a period of time on terminal joints such as 102 under varying conditions of current, temperature and voltage, as well as in atmospheres of oxygen, sulphur dioxide and heavy moisture as well as hydrogen peroxide, have shown there is no detectible change in the resistivity of the joint.

Attention is invited to FIG. 10 in which a small recess 110 is shown in the bottom of the joint 102. This recess may be caused by providing a small protuberance in the crimping die or crimping punch to cause an abrupt change in the surface on the interior of the terminal member 40 during crimping. While such change serves to bend the wires and break any oxide which may have been formed thereon during handling, it has no deleterious effect upon the strength or moisture resistance of the resulting joint 102.

It is believed that variations in the construction of the joint as well as in the method of forming the same may readily be made without departing from the spirit or scope of the invention as defined in the appended claims.

What it is desired to secure by Letters Patent of the United States is:

1. An electrical terminal member for use in making an electrical terminal joint, comprising an integral sheet metal structure having a pair of conjoined arms forming a V-shaped configuration and having a body portion arranged at an angle to the notch of the V-shaped configuration and secured at one end thereof, a plurality of irregularities formed on the inner surfaces of said conjoined arms, fastening means in the body portion, said arms arranged to receive a wire end along the juncture thereof soldered thereto and having a moisture barrier thereover, said arms constructed and arranged forcibly to be inwardly curled with a stranded second wire therein to establish electrical connection therethrough between said wires, and said irregularities establishing an effective and permanent electrical connection between said wire and the curled arms, said irregularities further comprising a barrier to prevent extrusion of sealing material between the second wire and said arms during curling while permitting circulation of said sealing material elsewhere within the curl, means on the opposite end of the V-shaped configuration for securing the end of the wire end thereto.

2. The terminal member of claim 1 in which said irregularities are in the form of scores defining a plurality of rib-like formations.

3. The terminal member of claim 2 wherein said means on the opposite end of the V-shaped configuration comprise an outwardly extending severable T-shaped portion.

4. The terminal member of claim 1 in which the last means is a slot.

References Cited

UNITED STATES PATENTS

| | | | |
|---|---|---|---|
| 731,400 | 6/1903 | Worthington | 339—277 X |
| 2,197,578 | 4/1940 | Darnell | 339—276 X |
| 2,263,539 | 11/1941 | Grush. | |
| 2,715,714 | 8/1955 | Pavlinetz | 339—273 X |
| 2,716,741 | 8/1955 | Ustin. | |
| 2,768,362 | 10/1956 | Garretson. | |
| 2,968,691 | 1/1961 | Canfield. | |
| 3,242,256 | 3/1966 | Jugle | 339—276 X |

FOREIGN PATENTS

| | | |
|---|---|---|
| 318,439 | 1/1920 | Germany. |
| 568,246 | 1/1933 | Germany. |

RICHARD E. MOORE, *Primary Examiner.*

P. TEITELBAUM, *Assistant Examiner.*

U.S. Cl. X.R.

174—84; 336—192; 339—244, 275, 276